Patented Dec. 27, 1938

2,141,570

UNITED STATES PATENT OFFICE 2,141,570

CONCRETE AND HYDRAULIC CEMENT

Jacob G. Mark, Brookline, Mass., assignor to Dewey and Almy Chemical Company, North Cambridge, Mass., a corporation of Massachusetts No Drawing. Application July 24, 1935, Serial No. 32,906

8 Claims. (Cl. 106—27)

This invention relates to concrete and the hydraulic cement from which it is prepared and comprises the introduction into the cement of a small quantity of a soluble lignin derivative.

An object of the invention is to increase the plasticity and workability of concrete by increasing the number of discrete particles available for hydration, to provide an effective dispersion agent for cement, to prepare cement containing dispersing agents, and to produce finished concretes having advantages in superior strength or lowered cost. These and other objects will become apparent from the specification.

The application for patent of G. R. Tucker, Serial No. 643,740 filed November 21, 1932, states that small quantities of certain substances, particularly the formaldehyde condensation products of the naphthalene sulphonic acids, bring about a more uniform distribution of the cement particles throughout their water-aggregate environment and make available for immediate hydration many more discrete cement particles than otherwise would exist in water mixtures of cement.

I have discovered that certain agents not mentioned by Dr. Tucker possess to an even more marked degree the property of dispersing cement particles and of producing high slump in concrete mixtures. In contradistinction to the agents mentioned by Dr. Tucker, which are comparatively costly, the substances which I may use are found in obnoxious wastes from paper mills and may be obtained very cheaply. These are the commercially pure, water-soluble derivatives of lignin.

The three common forms of waste produced in the purification of wood pulp are "waste sulphite liquor" from sulphite process mills, "sulphate liquor" from sulphate process mills and "black liquor" from mills using the soda process. From all of these wastes, very effective dispersing agents for cement may be prepared.

Waste sulphite liquor may be converted into a cement dispersing agent by starting with an intermediate product known in the trade as "Howard OP cake" which is prepared by the Howard process set forth in Patents Nos. 1,856,558 and Re. 18,268. "OP cake" may be described as tricalcium lignin sulphonate and is produced by the fractional precipitation of the inorganic and lignin components in the digester effluent. The tricalcium lignin sulphonate is, in this process, separated from the carbohydrates and other deleterious materials by filtration.

Although tricalcium lignin sulphonate is an effective cement dispersing agent, its solubility is low. Consequently, to avoid both handling large quantities of dilute solutions and the difficulty of redissolving the dried material, I prefer to use more soluble forms of lignin.

Such materials may be prepared by replacing all or part of the combined calcium with hydrogen; with alkali metals; ammonia; or other positive ions which are known to form soluble lignin salts. However, I have found that, contrary to expectation, tricalcium lignin sulphonate may be solubilized by treatment with an acid which forms soluble lime salts and that the lignin sulphonic acid salt so formed is not precipitated by the presence of the soluble lime salt which is formed at the same time. Thus, for example, I may treat "Howard OP cake" or other forms of tricalcium lignin sulphonate with hydrochloric acid and secure soluble lignin sulphonic acid salts. The pH and the amount of combined lime in the final product depend upon the quantity of hydrochloric acid used. I prefer, because of commercial considerations of concentration, stability, etc., to start with as heavy a slurry of tricalcium lignin sulphonate as can conveniently be handled by commercial mixing apparatus and I then add the acid in such concentration that the lignin products are neither precipitated, "burned", nor otherwise adversely affected. At the time of adding the acid, thorough agitation is highly advantageous. Also it is helpful, sometimes, to heat the mixture. By following the procedure which I have described, taking hydrochloric acid as a specific example, it is possible to prepare solutions containing 28 to 35% by weight of a neutral salt of lignin sulphonic acid.

It is not necessary to use an acid as strong as hydrochloric for this purpose. The only requirement is that it shall have sufficient strength to liberate that portion of the calcium which is less firmly combined in the tricalcium lignin sulphonate system. Calcium attached to the —SO₃— group is apparently firmly bound while the remainder is less securely attached to the molecule.

For certain uses, when the presence of a small amount of precipitate is unobjectionable, acids such as sulphuric or carbonic which form insoluble salts may be used to advantage. If a precipitate is undesirable, the product of the reaction of the acid and the "OP cake" (tricalcium lignin sulphonate) may be filtered to remove the precipitated salt.

Salts of lignin disulphonate (which may be made by treating the monosulphonate which I have just described with sulphur dioxide) are also very effective dispersing agents for cement, but are so much more costly than the monosulphonates that their commercial use may not be practical.

In all of the above compounds it is permissible for the amount of organically combined sulphur to vary widely. The amount of combined sulphur ranges from substantially more than 32 parts of sulphur in 500 parts of organic residues to less than 32 parts of sulphur in 1200 parts of residues. All of these compounds may be properly described as lignin sulphonates and I intend to include the whole group. They disperse cement excellently and are sufficiently soluble. Other lignin sulphonic compounds are effective and usable agents for the purposes of this invention. For example, lignin sulphonic acid disperses cement well, but is so sensitive to heat and is such a reactive substance that I do not recommend it for commercial use.

Sulphate liquor may be converted into a dispersing agent for cement by first precipitating the lignin, which, for example, may be done by adding acid, filtering the mixture to free it from the carbohydrates and other impurities which remain in solution and then adding an alkaline material to convert the lignin precipitate into a soluble substance.

The treatment of "black liquor" to convert it into a dispersing agent follows the above procedure.

At the present time the structure and internal linkage of lignin is wholly unsettled. No certain formula has been assigned to it. Consequently in describing other operative compounds I shall name them by the process of their manufacture.

As the effectiveness of dispersing agents produced from black liquor shows, the $SO_3H$ radical is important only in imparting water solubility to the lignin component. It is not essential in securing either the dispersed state of cement or for imparting plasticity. Generally speaking, any radical which imparts water solubility to the lignin is equally suitable. I have obtained excellent cement dispersing agents from:

A. The lignin sulphonates (already described).
B. Sodium lignate separated from "black liquor" and purified.
C. The sodium salt of the condensation product of lignin and glycerol monochlorhydrin.
D. The sodium salt of the condensation product of lignin and ethylene glycol.
E. Chlorolignin.
F. Phenol derivatives of lignin.

Compounds A and B have been discussed above.

Compound C.—(Sodium glycerol chlorhydrin lignin) is made by heating 100 parts of glycerol alpha monochlorhydrin, 10 parts of spruce dust, and two parts of 20° Bé. hydrochloric acid together at 100° C. for 1 to 2 hours. The filtrate should then be stirred into about 10 volumes of cold water, whereupon a precipitate forms. The precipitate is now filtered, washed and dissolved in the minimum amount of sodium hydrodxide. The product is an active dispersing agent for cement and markedly increases its workability.

Compound D.—(Sodium glycol lignin) is made by following the same process outlined above, starting, however, with 100 parts of ethylene glycol, 10 parts spruce dust, and two parts of concentrated hydrochloric acid. It is an active agent for dispersing cement and increases its workability.

Compound E.—(Chlorolignin) is made by passing a stream of chlorine gas for 1 to 2 hours through a mass of wet sawdust. The soluble portion is filtered, boiled, to free it of chlorine and hydrochloric acid and made just neutral to phenolphthalein.

Compound F.—(Sodium salt of lignin phenol) may be made by heating 4 parts of spruce dust, 50 parts of phenol and .02 part of concentrated hydrochloric acid together at 100° C. for from 1 to 2 hours. The liquid is then filtered to free it from the cellulose and the filtrate is steam distilled at 140° to 170° C. to remove the excess phenol. The dark liquid residue, which becomes solid on cooling, is dissolved in the minimum amount of sodium hydroxide. This material contains both alpha and beta lignin phenol. The fractions may be separated by extraction with ether. It will be found that the ether soluble part, after it is dissolved in the minimum amount of sodium hydroxide, disperses cement well, and that the insoluble precipitate, after being dissolved in the minimum quantity of sodium hydroxide, is also an effective cement dispersing agent.

Any of the dispersing agents described may be added to the cement by running a dilute (10 to 20%) water-solution of the specific agent onto the clinker as it enters the Hercules or Compeb mills or as the ground clinker enters the tube mill or between two tube mills or even in a specific compartment of a tube mill. The best location must be found by experiment since it varies, due to varying mill conditions such as the temperature of the entering clinker, the rate of grinding, etc.

I have found that water-soluble lignin compounds are approximately twice as effective as the agents which were specifically mentioned by Dr. Tucker and permit one to obtain maximum workability with very low additions of organic material. For example, considering the soluble lignin unit only and neglecting the metallic radicals associated therewith, one part of soluble lignin to 2000 parts of cement produces the workability I desire. The amount of such dispersing agents which may be added to cement, however, extends over a wide range. The smallest addition of a soluble lignin compound to a fresh concrete mixture will produce some increase in plasticity, and the plasticity increases as the concentration of the agent rises.

The invention may also be practiced by dissolving the dispersing agent in the guage water as the concrete is mixed or by adding a dry salt to the finished cement. For the latter purpose, to insure even distribution of the relatively minute quantity of the active agent, I find it convenient to mix a substantial amount of one of the dry salts with dry cement or with gypsum to form a master batch and then to mix thoroughly the proper amount of the master batch with the whole quantity of cement.

What I claim is:

1. Structural concrete of commercially acceptable compressive strength containing hydraulic cement and a water soluble derivative of lignin which has been separated by chemical treatment from other constituents present in the wastes of pulp recovery processes.

2. A dry cement having materially increased workability in the wet state and producing structural concretes of normal compressive strengths comprising hydraulic cement and a salt of lignin sulphonic acid separated by chemical treatment from other constituents present in waste sulphite liquor.

3. A dry cement having materially increased workability in the wet state and producing structural concretes of normal compressive strengths comprising hydraulic cement and a neutral, water soluble salt of lignin sulphonic acid separated by chemical treatment from other constituents present in waste sulphite liquor.

4. A dry cement having materially increased workability in the wet state and producing structural concretes of normal compressive strengths comprising hydraulic cement and a water soluble sodium salt of lignin sulphonic acid.

5. A dry cement having materially increased workability in the wet state and producing structural concretes of normal compressive strengths comprising hydraulic cement and a water soluble calcium salt of lignin sulphonic acid separated by chemical treatment from other constituents present in waste sulphite liquor.

6. A dry cement having materially increased workability in the wet state and producing structural concretes of normal compressive strengths comprising hydraulic cement and a sodium-calcium salt of lignin sulphonic acid.

7. A dry cement having materially increased workability in the wet state and producing structural concretes of normal compressive strengths comprising hydraulic cement and sodium lignate.

8. As an intermediate product, plastic cement concrete containing hydraulic cement and possessing high workability and producing structural concretes of commercially acceptable compressive strengths by virtue of the presence therein of a water-soluble derivative of lignin which has been separated by chemical treatment from other constituents present in the wastes of pulp recovery processes.

JACOB G. MARK.